(12) United States Patent
Asano et al.

(10) Patent No.: US 11,987,243 B2
(45) Date of Patent: May 21, 2024

(54) VEHICLE, PROGRAM AND NOTIFICATION METHOD

(71) Applicant: TOYOTA JIDOSHA KABUSHIKI KAISHA, Toyota (JP)

(72) Inventors: Tomotaka Asano, Susono (JP); Hiroki Shizuhata, Susono (JP); Yutaka Aoki, Mishima (JP); Satoshi Takahashi, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 258 days.

(21) Appl. No.: 17/652,033

(22) Filed: Feb. 22, 2022

(65) Prior Publication Data

US 2022/0324447 A1 Oct. 13, 2022

(30) Foreign Application Priority Data

Apr. 9, 2021 (JP) .............................. 2021-066724

(51) Int. Cl.
| | |
|---|---|
| *B60W 50/14* | (2020.01) |
| *B60W 10/18* | (2012.01) |
| *B60W 30/14* | (2006.01) |
| *B60W 30/182* | (2020.01) |
| *B60W 40/105* | (2012.01) |
| *B60W 60/00* | (2020.01) |

(52) U.S. Cl.
CPC .......... *B60W 30/143* (2013.01); *B60W 10/18* (2013.01); *B60W 30/182* (2013.01); *B60W 40/105* (2013.01); *B60W 50/14* (2013.01); *B60W 60/0053* (2020.02); *B60W 2050/146* (2013.01)

(58) Field of Classification Search
CPC .... B60W 50/14; B60W 30/143; B60W 10/18; B60W 30/182; B60W 40/105; B60W 60/0053; B60W 2050/146; G05D 1/0061
See application file for complete search history.

(56) References Cited

U.S. PATENT DOCUMENTS

| | | | |
|---|---|---|---|
| 2008/0275618 A1* | 11/2008 | Grimm | G08G 1/162 |
| | | | 701/96 |
| 2017/0225617 A1* | 8/2017 | Morimura | G06V 40/10 |
| 2020/0180660 A1* | 6/2020 | Honda | B60W 50/08 |
| 2020/0180661 A1* | 6/2020 | Honda | B60W 50/14 |
| 2023/0294701 A1* | 9/2023 | Kato | B60W 60/10 |
| | | | 701/26 |

FOREIGN PATENT DOCUMENTS

JP 2005028896 A 2/2005

* cited by examiner

*Primary Examiner* — Ryan Rink
(74) *Attorney, Agent, or Firm* — Dickinson Wright, PLLC

(57) ABSTRACT

A control mode of speed control includes a first control mode in which an actual speed is caused to follow a target speed through active use of a brake and a second control mode in which the actual speed is caused to follow the target speed while use of the brake is suppressed. An autonomous driving system changes a threshold value to a value larger than a value in the first control mode when the control mode is switched from the first control mode to the second control mode, and changes the threshold value to a value smaller than a value in the second control mode when the control mode is switched from the second control mode to the first control mode.

3 Claims, 5 Drawing Sheets

VEHICLE, PROGRAM AND NOTIFICATION METHOD

CROSS-REFERENCE TO RELATED APPLICATION

This application claims priority to Japanese Patent Application No. 2021-066724 filed on Apr. 9, 2021, incorporated herein by reference in its entirety.

BACKGROUND

1. Technical Field

The present disclosure relates to a vehicle, a program, and a notification method, and more particularly to a vehicle provided with an autonomous driving system that executes speed control for causing an actual speed to follow a target speed, and a suitable program and a notification method to be used for the vehicle.

2. Description of Related Art

When a vehicle travels on a long downhill road, the vehicle may reach a brake fade state due to heavy use of a brake. Japanese Unexamined Patent Application Publication No. 2005-028896 (JP 2005-028896 A) discloses that, leading to a situation where a braking force is required to be generated is suppressed by changing a control characteristics of follow-up traveling control to that having a smaller acceleration change when the brake fade state is predicted to occur while the follow-up traveling control is executed.

SUMMARY

In a vehicle equipped with an autonomous driving system, a target speed is set in accordance with an action plan, and speed control is executed such that the actual speed is caused to follow the target speed. When a speed error between the target speed and the actual speed exceeds a threshold value in the speed control, a notification is provided to a driver. The notification to the driver includes, for example, a hands-on request notification requesting the driver to touch the steering wheel and a transition demand (TD) notification notifying the driver of a request for transferring a driving authority from the autonomous driving system to the driver.

When the technique described in JP 2005-028896 A is applied to the autonomous driving system, the followability of the actual speed with respect to the target speed is lowered as the frequency of generation of the braking force is lowered. As a result, the occasion that the speed error between the target speed and the actual speed exceeds the threshold value increases, and the frequency of notifications to the driver also increases. However, the increase in the speed error between the target speed and the actual speed in this case is temporary to suppress the brake fade. That is, even when the followability of the actual speed with respect to the target speed is lowered, such reduction is within the permissible range as a driver assistance function of the autonomous driving system, and it may not be necessary to provide a notification to the driver. Frequent notifications that are not always necessary can be annoying to the driver.

An object of the present disclosure is to provide a technique capable of optimizing the frequency of notifications issued to the driver when the followability of the actual speed with respect to the target speed is lowered while the speed control by the autonomous driving system is being executed.

The present disclosure provides a vehicle for achieving the above object. The vehicle according to the present disclosure is a vehicle equipped with an autonomous driving system that executes speed control that causes an actual speed to follow a target speed. The autonomous driving system included in the vehicle according to the present disclosure includes at least one memory that stores at least one program, and at least one processor connected to the at least one memory. The at least one processor executes, through execution of the at least one program, a control mode switching process, a notification process, a first threshold value change process, and a second threshold value change process as described below.

The control mode switching process is a process of switching a control mode of the speed control between a first control mode and a second control mode in accordance with a driving condition, the first control mode being a mode in which the actual speed is caused to follow the target speed through active use of a brake, and the second control mode being a mode in which the actual speed is caused to follow the target speed while use of the brake is suppressed. The notification process is a process of providing a notification to a driver when a speed error between the target speed and the actual speed exceeds a threshold value while the speed control is being executed. The first threshold value change process is a process of changing the threshold value to a value larger than a value in the first control mode when the control mode is switched from the first control mode to the second control mode. The second threshold value change process is a process of changing the threshold value to a value smaller than a value in the second control mode when the control mode is switched from the second control mode to the first control mode.

In the vehicle according to the present disclosure, in the second threshold value change process, the threshold value may be gradually changed to the value smaller than the value in the second control mode. Further, in the first threshold value change process, the threshold value may be gradually changed to the value larger than the value in the first control mode.

The present disclosure provides a program for achieving the above object. The program according to the present disclosure is a program that causes a computer to execute notification to a driver of a vehicle equipped with an autonomous driving system that executes speed control to cause an actual speed to follow a target speed when a speed error between the target speed and the actual speed exceeds a threshold value. Here, a control mode of the speed control includes a first control mode in which the actual speed is caused to follow the target speed through active use of a brake and a second control mode in which the actual speed is caused to follow the target speed while use of the brake is suppressed.

The program according to the present disclosure causes the computer to execute a process of changing the threshold value to a value larger than a value in the first control mode when the control mode is switched from the first control mode to the second control mode. Further, the program according to the present disclosure causes the computer to execute a process of changing the threshold value to a value smaller than a value in the second control mode when the control mode is switched from the second control mode to the first control mode.

The present disclosure provides a notification method for achieving the above object. The notification method according to the present disclosure is a method for providing notification to a driver of a vehicle equipped with an autonomous driving system that executes speed control to cause an actual speed to follow a target speed when a speed error between the target speed and the actual speed exceeds a threshold value. Here, a control mode of the speed control includes a first control mode in which the actual speed is caused to follow the target speed through active use of a brake and a second control mode in which the actual speed is caused to follow the target speed while use of the brake is suppressed.

The notification method according to the present disclosure includes a first step and a second step. The first step is a step of changing the threshold value to a value larger than a value in the first control mode when the control mode is switched from the first control mode to the second control mode. The second step is a step of changing the threshold value to a value smaller than a value in the second control mode when the control mode is switched from the second control mode to the first control mode.

According to the vehicle, the program, and the notification method according to the present disclosure, when the first control mode in which the actual speed is caused to follow the target speed through the active use of the brake is selected as the control mode of the speed control, the threshold value is set to a relatively small value. On the other hand, when the second control mode in which the actual speed is caused to follow the target speed while use of the brake is suppressed is selected as the control mode of the speed control, the threshold value is set to a relatively large value.

The first control mode is a control mode in which a relatively high target speed follow-up performance is realized through active use of the brake. Therefore, the speed error between the target speed and the actual speed is relatively unlikely to occur. According to the vehicle, the program, and the notification method according to the present disclosure, setting the threshold value to a relatively small value makes it possible to suppress the malfunction of the autonomous driving system from being overlooked. The second control mode is a control mode in which the target speed follow-up performance is relatively lowered than in the first control mode while the use of the brake is suppressed. Therefore, the speed error between the target speed and the actual speed is relatively likely to occur.

According to the vehicle, the program, and the notification method according to the present disclosure, setting the threshold value to a relatively large value makes it possible to suppress notifications that are not always necessary from being frequently issued. That is, according to the vehicle, the program, and the notification method according to the present disclosure, the frequency of notifications provided to the driver can be optimized when the followability of the actual speed with respect to the target speed is lowered while the speed control is being executed by the autonomous driving system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. However, when the number, quantity, amount, range, etc. of each element are referred to in the embodiments shown below, the idea of the present disclosure is not limited to the numbers mentioned herein except when explicitly stated or when clearly specified by the number in principle. In addition, the structures and the like described in the embodiments shown below are not necessarily essential to the idea of the present disclosure, except when explicitly stated or when clearly specified in principle.

Figure 1:
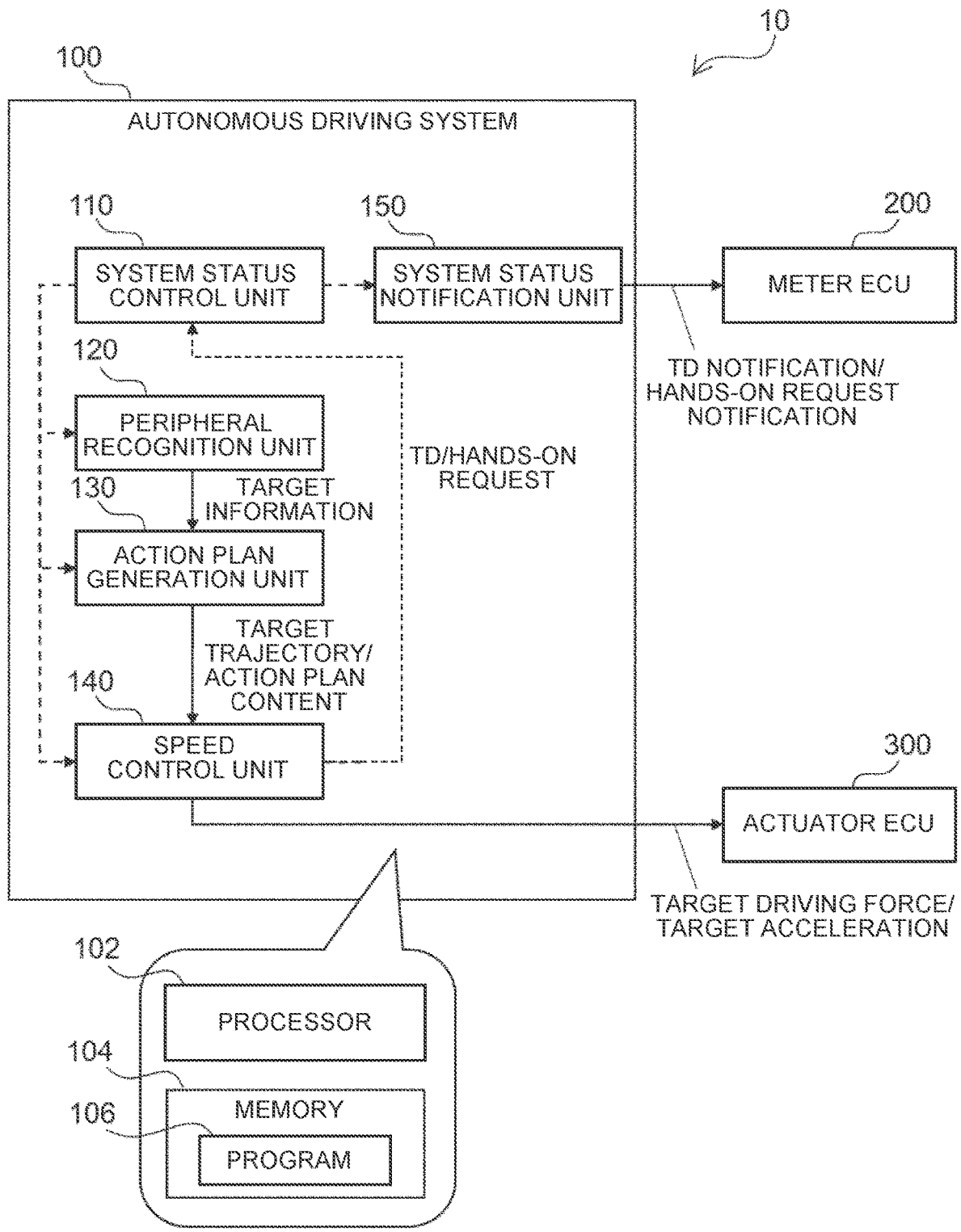
FIG. 1 is a block diagram showing a configuration of an autonomous driving system included in a vehicle according to a first embodiment of the present disclosure.

1. First Embodiment 1-1. Vehicle Configuration Provided with Autonomous Driving System FIG. 1 is a block diagram showing a configuration of an autonomous driving system included in a vehicle according to a first embodiment of the present disclosure. An autonomous driving system 100 included in a vehicle 10 is an electronic control unit (ECU) provided with at least one processor 102 (hereinafter, simply referred to as a processor 102) and at least one memory 104 (hereinafter, simply referred to as a memory 104), that is, a computer. The memory 104 includes a main storage device and an auxiliary storage device. The memory 104 stores at least one program 106 (hereinafter, simply referred to as program 106) that can be executed by the processor 102 and various data related thereto. Various functions are realized in the autonomous driving system 100 as the processor 102 executes the program 106 stored in the memory 104. The ECU constituting the autonomous driving system 100 may be a group of a plurality of ECUs.

As shown by a block in FIG. 1, the autonomous driving system 100 has a system status control unit 110, a peripheral recognition unit 120, an action plan generation unit 130, a speed control unit 140, and a system status notification unit 150 as configurations related to autonomous driving of the vehicle 10. The units above are realized as functions of the autonomous driving system 100 when the program 106 stored in the memory 104 is executed by the processor 102.

The system status control unit 110 is configured to communicate with each of the peripheral recognition unit 120, the action plan generation unit 130, the speed control unit 140, and the system status notification unit 150.

The peripheral recognition unit 120 executes recognition of a peripheral situation of the vehicle 10 using a recognition sensor (not shown) such as a camera, light detection and ranging (LiDAR), or radar, and acquires target information of a preceding vehicle, a pedestrian, or the like. Since the method for acquiring the target information by the recognition sensor is known, the description thereof is omitted here.

The action plan generation unit 130 generates an action plan for the vehicle 10 based on map information of a map database, position information of the vehicle 10 acquired using the global positioning system (GPS), and the target information acquired by the peripheral recognition unit 120. The action plan includes a target trajectory for causing the vehicle 10 to travel along a preset travel route and the content of the action plan. The target trajectory is generated as that having a plurality of sets consisting of two elements, a target position in a coordinate system fixed to the vehicle 10 and a target speed at each target point. The content of the action plan are the content that corresponds to the purpose of speed control of autonomous driving. The content of the action plan is determined in accordance with the driving conditions such as traveling at a constant speed, decelerating on a curve, following a preceding vehicle, and traveling on a long downhill road.

The speed control unit 140 controls the speed of the vehicle 10 based on the action plan generated by the action plan generation unit 130. The action plan includes the target trajectory. The speed control unit 140 determines a target driving force and target acceleration such that the vehicle 10 travels along the target trajectory. More specifically, the speed control unit 140 calculates the speed error between the target speed included in the target trajectory and the actual speed of the vehicle 10 measured by a wheel speed sensor, and determines the target driving force and the target acceleration so as to reduce the speed error.

The speed control unit 140 executes a control mode switching process for switching a control mode of the speed control based on the content of the action plan. The control mode includes a first control mode and a second control mode, and the calculation method for determining the target driving force and the target acceleration from the speed error is different for each control mode. Specifically, in the first control mode, the target driving force and the target acceleration are determined such that the actual speed is caused to follow the target speed by actively using the brake. On the other hand, in the second control mode, the target driving force and the target acceleration are determined such that the actual speed is caused to follow the target speed while use of the brake is suppressed. The method for determining the control mode of the speed control will be described in detail later.

The target driving force and the target acceleration determined by the speed control unit 140 are transmitted to an actuator ECU 300. The actuator ECU 300 controls the driving force and braking force of a control drive system so as to realize the target driving force and the target acceleration. The control drive system includes, for example, a power device such as an electric motor, an engine, and a hybrid system capable of controlling the control drive force, and an electronic brake control system capable of controlling the braking force.

When the speed error between the target speed and the actual speed becomes large, there is a possibility that the autonomous driving system 100 cannot continue autonomous driving due to environmental conditions or a malfunction of the autonomous driving system 100. Therefore, the speed control unit 140 executes the speed control so as to cause the actual speed to follow the target speed, and at the same time, executes a hands-on request determination and a TD determination based on the speed error between the target speed and the actual speed. The hands-on request determination is a determination as to whether to request the driver to perform hands-on. The TD determination is a determination as to whether to request transfer of the driving authority (TD) from the autonomous driving system 100 to the driver.

In the hands-on request determination, the speed control unit 140 compares the speed error with a predetermined hands-on request threshold value. When the speed error exceeds the hands-on request threshold value, a hands-on request is output to the speed control unit 140 and the system status control unit 110. In the TD determination, the speed control unit 140 compares the speed error with a predetermined TD threshold value. The TD threshold value is set to a value larger than the hands-on request threshold value. Therefore, the speed error always exceeds the TD threshold value after the speed error exceeds the hands-on request threshold value. When the speed error exceeds the TD threshold value, the TD is output to the speed control unit 140 and the system status control unit 110. As will be described in detail later, the settings of the hands-on request threshold value and the TD threshold value are changed in accordance with the control mode.

The system status notification unit 150 executes a notification process.

Specifically, when the system status control unit 110 receives the hands-on request from the speed control unit 140, the system status control unit 110 transmits a command to the system status notification unit 150. The system status notification unit 150 receives a command from the system status control unit 110 and outputs a hands-on request notification to the meter ECU 200. Similarly, when the system status control unit 110 receives the TD from the speed control unit 140, the system status control unit 110 transmits a command to the system status notification unit 150. The system status notification unit 150 outputs a TD notification to the meter ECU 200 in response to a command from the system status control unit 110. The meter ECU 200 is an ECU that controls a display that notifies the driver of the state of the system.

1-2. Method for Determining Control Mode of Speed Control

In the autonomous driving system 100, the target speed is set in accordance with the content of the action plan. For example, follow-up control is executed with the set vehicle speed set by the driver as the target vehicle speed on a straight road where there is no preceding vehicle. On the other hand, when a preceding vehicle slower than the set vehicle speed set by the driver is present, the follow-up control is executed with a speed set based on the speed of the preceding vehicle as a target vehicle speed so as to follow the preceding vehicle. Even when the preceding vehicle interrupts in front of the vehicle 10, the target vehicle speed is set based on the speed of the interrupted preceding vehicle.

Further, on a curved road, there may be a case where the follow-up control is executed with a speed slower than the set vehicle speed set by the driver as the target vehicle speed such that the vehicle can safely travel on the curved road. Roughly speaking, the content of the action plan of the autonomous driving system 100 can be categorized into the content of simply controlling the vehicle speed to follow the set vehicle speed set by the driver (action plan content 1) and the content of controlling the vehicle speed to follow the target vehicle speed that is changed in accordance with the surrounding conditions (action plan content 2).

Figure 2:
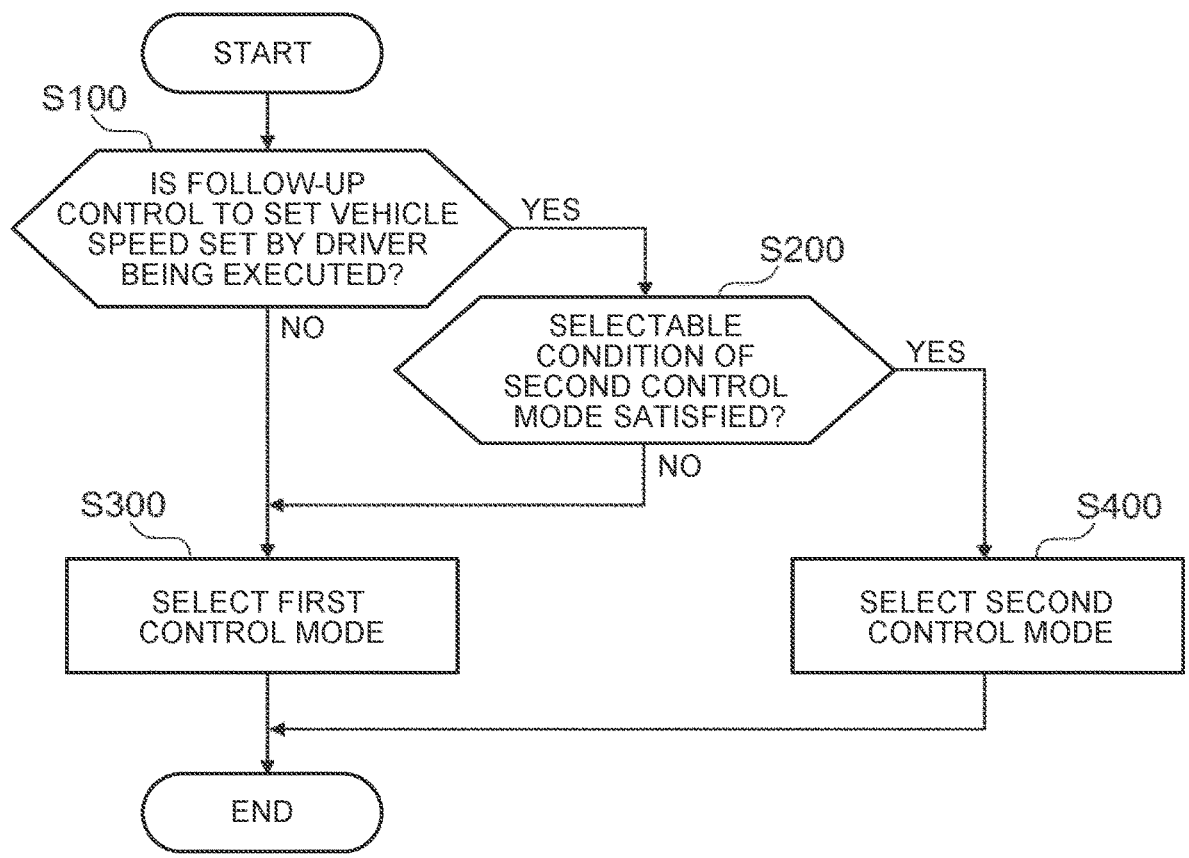
FIG. 2 is a flowchart showing a method for determining a control mode of speed control executed by the autonomous driving system included in the vehicle according to the first embodiment of the present disclosure.

FIG. 2 is a flowchart showing a method for determining a control mode of the speed control executed by the autonomous driving system 100. In step S100, whether the follow-up control is being executed to follow the set vehicle speed set by the driver, that is, whether the speed control is being executed in accordance with the above action plan content 1, is determined.

As a result of the determination in step S100, when the speed control is executed in accordance with the action plan content 2 instead of the action plan content 1, step S300 is executed. In step S300, a first control mode is selected as the control mode of the speed control. In the first control mode, the target driving force and the target acceleration are determined such that the actual speed is caused to follow the target speed through active use of the brake. Execution of the speed control in the first control mode makes it possible to realize high speed follow-up performance with respect to the target speed that is changed in accordance with the surrounding conditions.

On the other hand, as a result of the determination in step S100, when the speed control is being executed in accordance with the action plan content 1, step S200 is executed. In step S200, whether a selectable condition of the second control mode is satisfied is further determined. The action plan content 1 includes a content that satisfies the selectable condition of the second control mode (action plan content 3). In step S200, whether the action plan content 1 is the action plan content 3 is determined.

In the second control mode, the speed control is executed so as to cause the actual speed to follow the target speed while use of the brake is suppressed. Therefore, when the second control mode is selected, the brake is not actively used, whereby the speed follow-up performance with respect to the target speed is lowered compared to when the first control mode is selected. Nevertheless, as a case in which there is an advantage in selecting the second control mode, for example, a case in which the vehicle 10 is traveling on a long downhill road can be exemplified. There may be a case where, on a long downhill road, heavy use of the brake can cause the brake fade state. However, when the second control mode is selected, it is possible to suppress use of the brake, and therefore possible to suppress the brake from being placed in the brake fade state. An example of the action plan content 3 is that the follow-up control is simply executed to follow the set vehicle speed set by the driver on a long downhill road.

As a result of the determination in step S200, when the selectable condition of the second control mode is not satisfied, that is, when the execution condition of the speed control in accordance with the above action plan content 3 is not satisfied, step S300 is executed. Execution of step S300 to execute the speed control in the first control mode makes it possible to suppress the speed follow-up performance with respect to the target speed from being unnecessarily lowered. On the other hand, as a result of the determination in step S200, when the selectable condition of the second control mode is satisfied, step S400 is executed. In step S400, the second control mode is selected as the control mode of the speed control. Selection of the second control mode makes it possible to suppress the brake from being placed in the brake fade state when the vehicle 10 travels on a long downhill road, for example.

1-3. Threshold Setting in Each Control Mode

Figure 3:
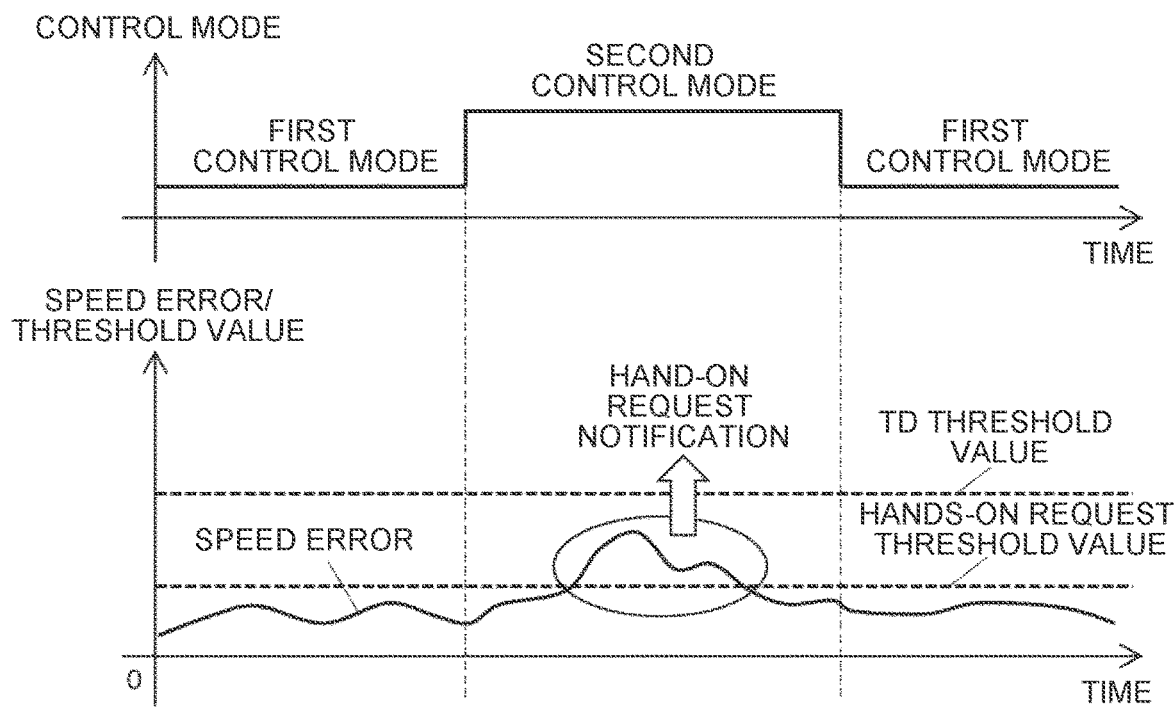
FIG. 3 is a diagram illustrating an issue that arises when the control mode is switched.
Figure 4:
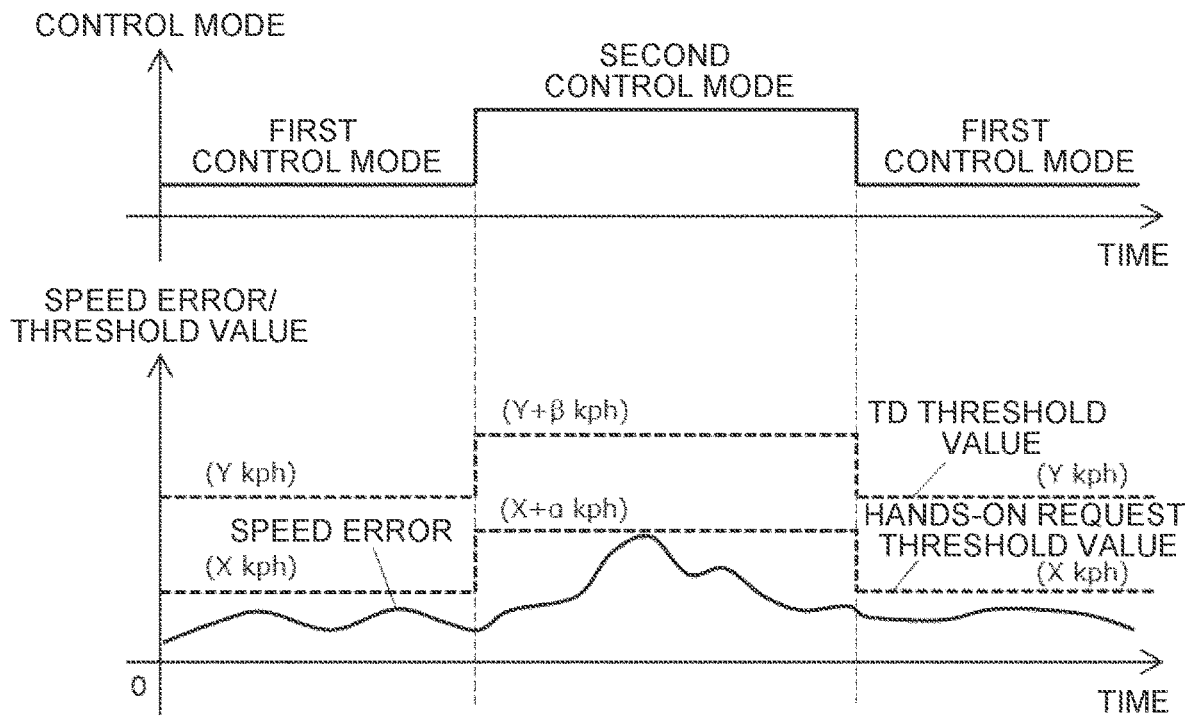
FIG. 4 is a diagram showing threshold value setting according to the first embodiment of the present disclosure.

Next, the setting of the threshold value in each control mode determined as described above will be described with reference to FIGS. 3 and 4. FIGS. 3 and 4 each show an example of a time-dependent change in the speed error when the control mode is switched from the first control mode to the second control mode and then switched from the second control mode to the first control mode again. However, the time-dependent change in the speed error shown in FIG. 3 is the same as the time-dependent change in the speed error shown in FIG. 4.

The speed follow-up performance of the second control mode is lowered compared to that of the first control mode. Therefore, the speed error tends to be large. However, an increase in the speed error in this case is temporarily caused so as to suppress the brake from being placed in the brake fade state. Therefore, even when the speed error increases, the increase may be within the permissible range for the driver assistance function of the autonomous driving system 100, depending on the degree of the speed error.

However, when the hands-on request threshold value is constant regardless of the control mode as shown in FIG. 3, the speed error may easily exceed the hands-on request threshold value when the control mode is the second control mode. In this case, frequent provision of the hands-on request notification to the driver that is not originally necessary may annoy the driver. Further, assuming that the TD threshold value is constant regardless of the control mode as shown in FIG. 3, when the control mode is the second control mode, the speed error may easily exceed the TD threshold value. In this case, although the hands-on request notification is sufficient, the TD notification is provided to the driver, which may cause the driver to perform human driving that is not originally necessary.

In order to solve the issue described with reference to FIG. 3, each threshold value is set as shown in FIG. 4 in the first embodiment. First, the hands-on request threshold value is set to be larger in the second control mode than in the first control mode. Specifically, the hands-on request threshold value in the first control mode is set to X [kph], whereas the hands-on request threshold value in the second control mode set to X+α [kph] that is larger than that in the first control mode by α [kph].

The TD threshold value is larger than the hands-on request threshold value, and the TD threshold value in the second control mode is larger than the TD threshold value in the first control mode. Specifically, the TD threshold value in the first control mode is set to Y [kph], whereas the TD threshold value in the second control mode is set to Y+β [kph] that is larger than that in the first control mode by β [kph]. Y is greater than X, and Y+β is greater than X+α.

When the control mode is switched from the first control mode to the second control mode by setting each threshold value as described above, the hands-on request threshold value and the TD threshold value are changed to values larger than the values in the first control mode, respectively. Hereinafter, the process executed by the autonomous driving system 100 is referred to as a first threshold value change process. Specifically, in the first threshold value change process according to the first embodiment, each threshold value is increased in a manner of step function. Further, when the control mode is switched from the second control mode to the first control mode, the hands-on request threshold value and the TD threshold value are changed to values smaller than the values in the second control mode, respectively. Hereinafter, the process executed by the autonomous driving system 100 is referred to as a second threshold value change process. Specifically, in the second threshold value change process according to the first embodiment, each threshold value is lowered in a manner of step function.

Even when the speed error increases due to switching from the first control mode to the second control mode by increasing the value of the hands-on request threshold value in the second control mode to be larger than the value in the first control mode, the speed error is suppressed from exceeding the hands-on request threshold value. With this configuration, it is possible to suppress the driver from receiving notifications that are not always necessary. Further, increasing the value of the TD threshold value in the second control mode to be larger than the value in the first control mode makes it possible to suppress the driver from receiving the TD notification regardless of the condition that the hands-on request notification is sufficient when the control mode is switched to the second control mode.

2. Second Embodiment

Next, a second embodiment according to the present disclosure will be described. However, the configuration of the autonomous driving system included in the vehicle according to the second embodiment is the same as that of the first embodiment, and is represented by the block diagram shown in FIG. 1. Further, in the second embodiment, the control mode of the speed control is determined in accordance with the flowchart in FIG. 2 that is common to the first embodiment. The second embodiment is different from the first embodiment in setting of the threshold value in each control mode.

Figure 5:
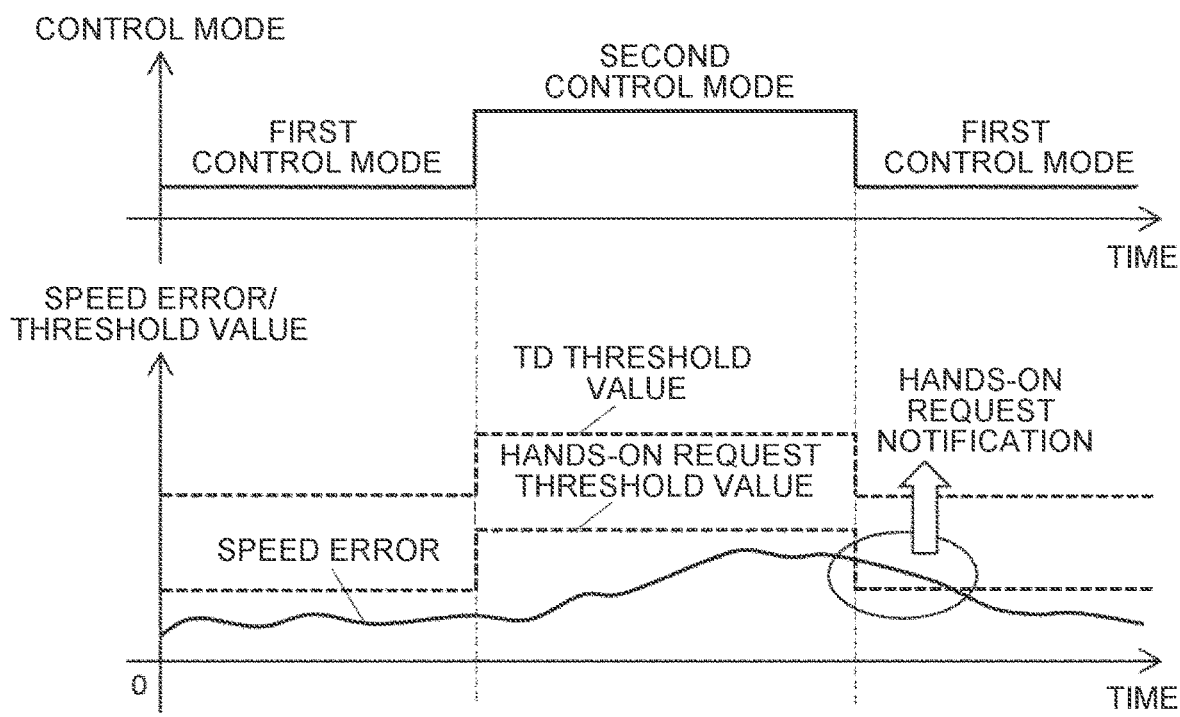
FIG. 5 is a diagram illustrating an issue that arises when the control mode is switched.
Figure 6:
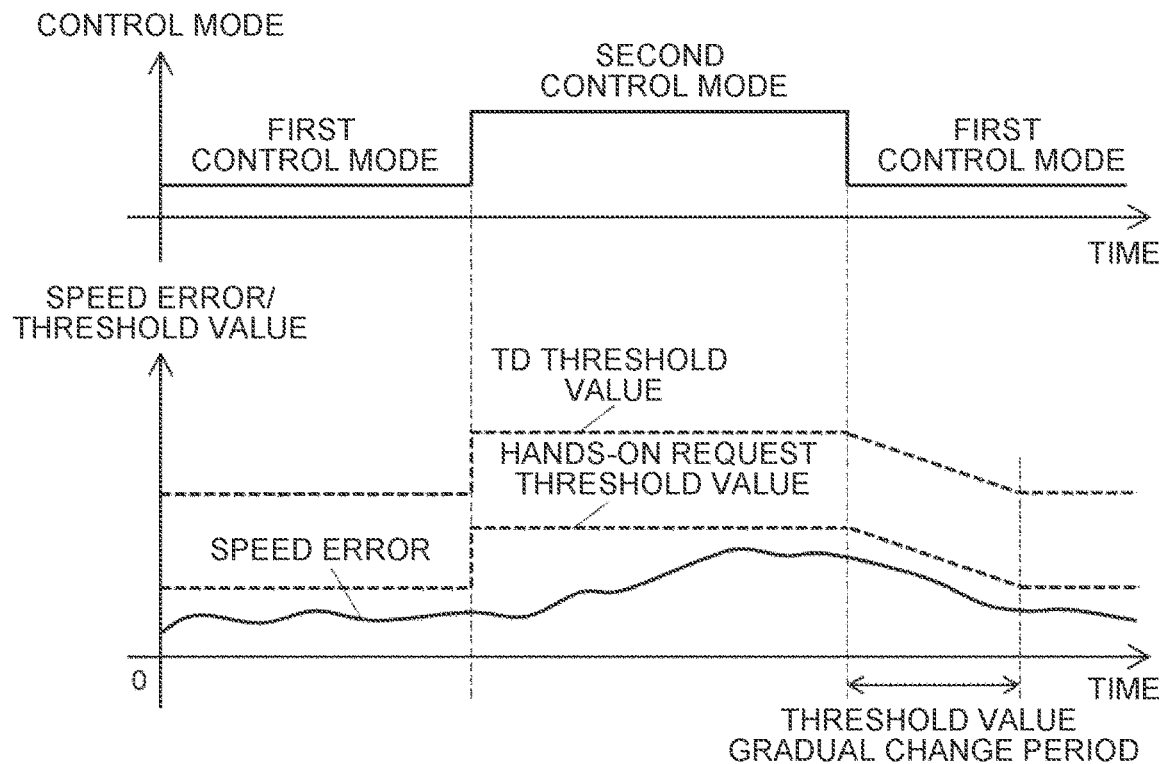
FIG. 6 is a diagram showing threshold value setting according to a second embodiment of the present disclosure.

FIGS. 5 and 6 each show an example of a time-dependent change in the speed error when the control mode is switched from the first control mode to the second control mode and then switched from the second control mode to the first control mode again. However, the time-dependent change in the speed error shown in FIG. 5 is the same as the time-dependent change in the speed error shown in FIG. 6.

The setting of the threshold value shown in FIG. 5 is the setting of the threshold value according to the first embodiment. The hands-on request threshold value is set to be larger in the second control mode than in the first control mode. The TD threshold value is larger than the hands-on request threshold value, and the TD threshold value in the second control mode is larger than the TD threshold value in the first control mode. With the setting of each threshold value as described above, even when the speed error increases due to switching from the first control mode to the second control mode, the speed error is suppressed from exceeding the hands-on request threshold value, and further, the speed error is suppressed from exceeding the TD threshold value.

However, the increased speed error in the second control mode does not immediately converge even when the control mode is switched to the first control mode again.

Therefore, as shown in FIG. 5, when the hands-on request threshold value is lowered in a manner of step function in response to the switching from the second control mode to the first control mode, the speed error temporarily exceeds the hands-on request threshold, and therefore, the hands-on request notification is issued to the driver. However, when no system malfunction or the like has occurred, the speed error converges as time elapses from the switching to the first control mode. Therefore, even when the speed error occurs immediately after switching to the first control mode, it is desirable to refrain from providing the hands-on request notification unless the occurrence of the speed error continues for a long time. The same applies to the TD notifications made when the speed error exceeds the TD threshold value.

In order to solve the problem described in FIG. 5, each threshold value is set as shown in FIG. 6 according to the second embodiment. First, when the control mode is switched from the first control mode to the second control mode, the hands-on request threshold value and the TD threshold value are changed to values larger than the values in the first control mode, respectively, by executing the first threshold value change process. Similar to the first embodiment, in the first threshold value change process according to the second embodiment, each threshold value is increased in a manner of step function.

Next, when the control mode is switched from the first control mode to the second control mode again, the hands-on request threshold value and the TD threshold value are returned to values lower than the values in the second control mode, respectively, by executing the second threshold value change process. However, in the second threshold value change process according to the first embodiment, each threshold value is lowered in a manner of step function, whereas in the second threshold value changing process according to the second embodiment, each threshold value is gradually lowered over a predetermined threshold value gradual change period.

After the control mode is switched from the second control mode to the first control mode, it takes a certain amount of time for the increased speed error in the second control mode to converge. According to the second embodiment, after the second control mode is switched from the second control mode to the first control mode, the hands-on request threshold value is gradually lowered such that the temporarily increased speed error can be suppressed from exceeding the hands-on request threshold value. With this configuration, it is possible to suppress the driver from frequently receiving the hands-on request notifications that are not always necessary. Further, gradually lowering the TD threshold value after the control mode is switched to the first control mode makes it possible to suppress the driver from receiving the TD notification regardless of the condition that the hands-on request notification is sufficient when the speed error increases even after the control mode is switched to the first control mode.

3. Third Embodiment

Next, a third embodiment according to the present disclosure will be described. However, the configuration of the autonomous driving system included in the vehicle according to the third embodiment is the same as that of the first embodiment, and is represented by the block diagram shown in FIG. 1. Further, in the third embodiment, the control mode of the speed control is determined in accordance with the flowchart in FIG. 2 that is common to the first embodiment. The third embodiment is different from the first embodiment and the second embodiment in setting of the threshold value in each control mode.

Figure 7:
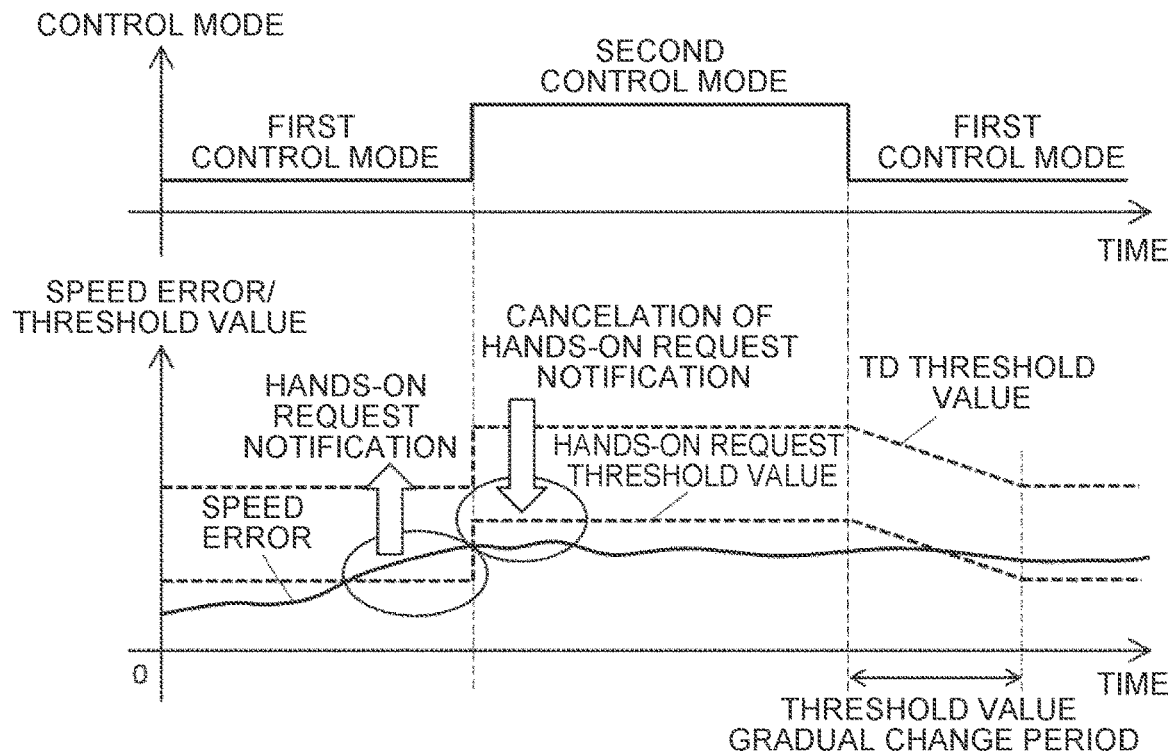
FIG. 7 is a diagram illustrating an issue that arises when the control mode is switched.
Figure 8:
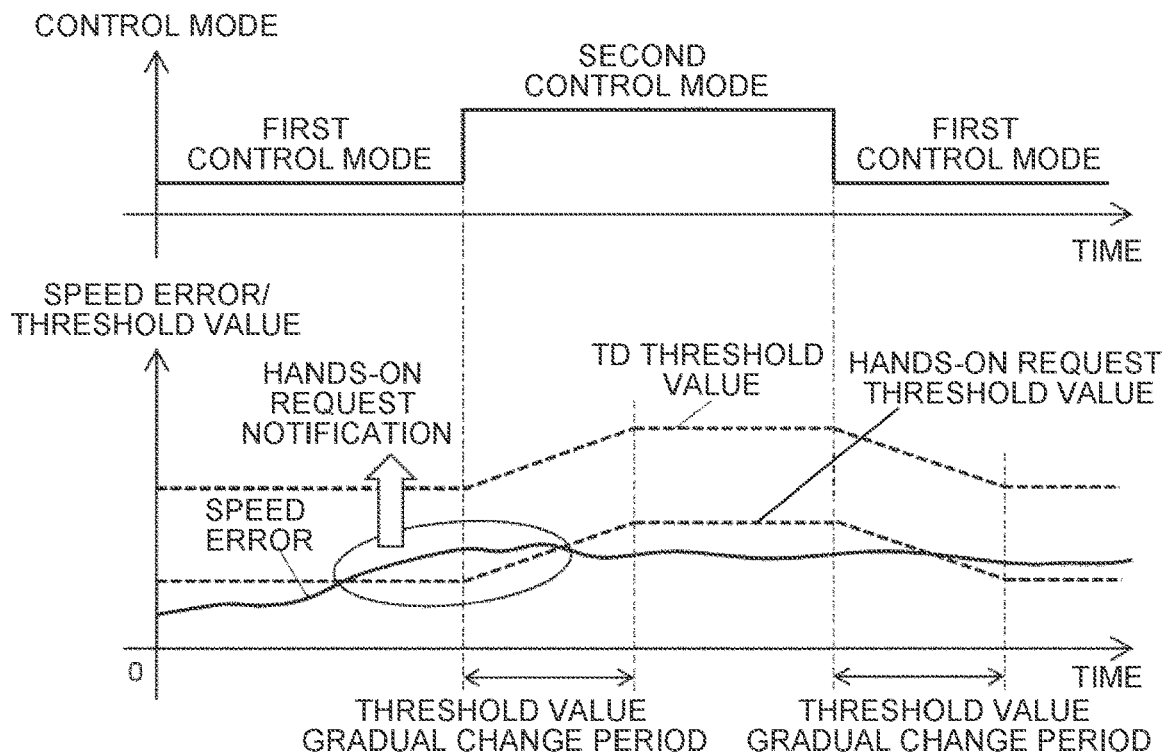
FIG. 8 is a diagram showing threshold value setting according to a third embodiment of the present disclosure.

FIGS. 7 and 8 each show an example of a time-dependent change in the speed error when the control mode is switched from the first control mode to the second control mode and then switched from the second control mode to the first control mode again. However, the time-dependent change in the speed error shown in FIG. 7 is the same as the time-dependent change in the speed error shown in FIG. 8.

The setting of the threshold value shown in FIG. 7 is the setting of the threshold value according to the second embodiment. The hands-on request threshold value is set to be larger in the second control mode than in the first control mode. The TD threshold value is larger than the hands-on request threshold value, and the TD threshold value in the second control mode is larger than the TD threshold value in the first control mode. With the setting of each threshold value as described above, even when the speed error increases due to switching from the first control mode to the second control mode, the speed error is suppressed from exceeding the hands-on request threshold value, and further, the speed error is suppressed from exceeding the TD threshold value.

However, there is a possibility that the speed error has already exceeded the hands-on request threshold value at the stage of the first control mode, and the control mode is switched from the first control mode to the second control mode while the hands-on request notification is being provided. In that case, when the hands-on request threshold value is increased in a manner of step function in response to the switching from the first control mode to the second control mode, the speed error settles within the hands-on request threshold, and therefore, the hands-on request notification is canceled. The hands-on request notification issued to the driver at the stage of the first control mode is a necessary hands-on request notification due to a system malfunction or the like. Therefore, it is not desirable that the hands-on request notification be canceled as the control mode is switched to the second control mode. The same applies to the TD notifications made when the speed error exceeds the TD threshold value.

In order to solve the issue described in FIG. 7, each threshold value is set as shown in FIG. 8 according to the third embodiment. First, when the control mode is switched from the first control mode to the second control mode, the hands-on request threshold value and the TD threshold value are changed to values larger than the values in the first control mode, respectively, by executing the first threshold value change process. However, in the first threshold value change process according to the first embodiment and the second embodiment, each threshold value is increased in a manner of step function, whereas in the first threshold value changing process according to the third embodiment, each threshold value is gradually increased over a predetermined threshold value gradual change period.

Next, when the control mode is switched from the second control mode to the first control mode again, the hands-on request threshold value and the TD threshold value are changed to values smaller than the values in the second control mode, respectively, by executing the second threshold value change process. Similar to the second embodiment, in the second threshold value change process according to the third embodiment, each threshold value is gradually lowered over the predetermined threshold value gradual change period.

The speed error that occurs during the speed control in the first control mode continues to occur even after the control mode is switched from the second control mode to the first control mode when the speed error is not a temporary error and caused by a system malfunction. When the speed error caused by the system malfunction, it is preferable that the hands-on request be issued to the driver to prepare for switching from autonomous driving to human driving. According to the third embodiment, after the control mode is switched from the first control mode to the second control mode, the hands-on request threshold is gradually increased such that a period during which the speed error exceeds the hands-on request threshold value, that is, a period during which the hands-on request notification is provided to the driver, is extended. This makes it easier for the driver to notice the hands-on request notification and allows the driver to prepare for switching to human driving. Further, gradual increase of the TD threshold value after the control mode is switched to the second control mode extends the period during which the TD notification is issued to the driver in a case in which the TD notification continues to be issued until immediately before the switching to the second control mode. This makes it easier for the driver to notice the TD notification, whereby the driving authority can be quickly transferred from the autonomous driving system 100 to the driver.

Figure 9:
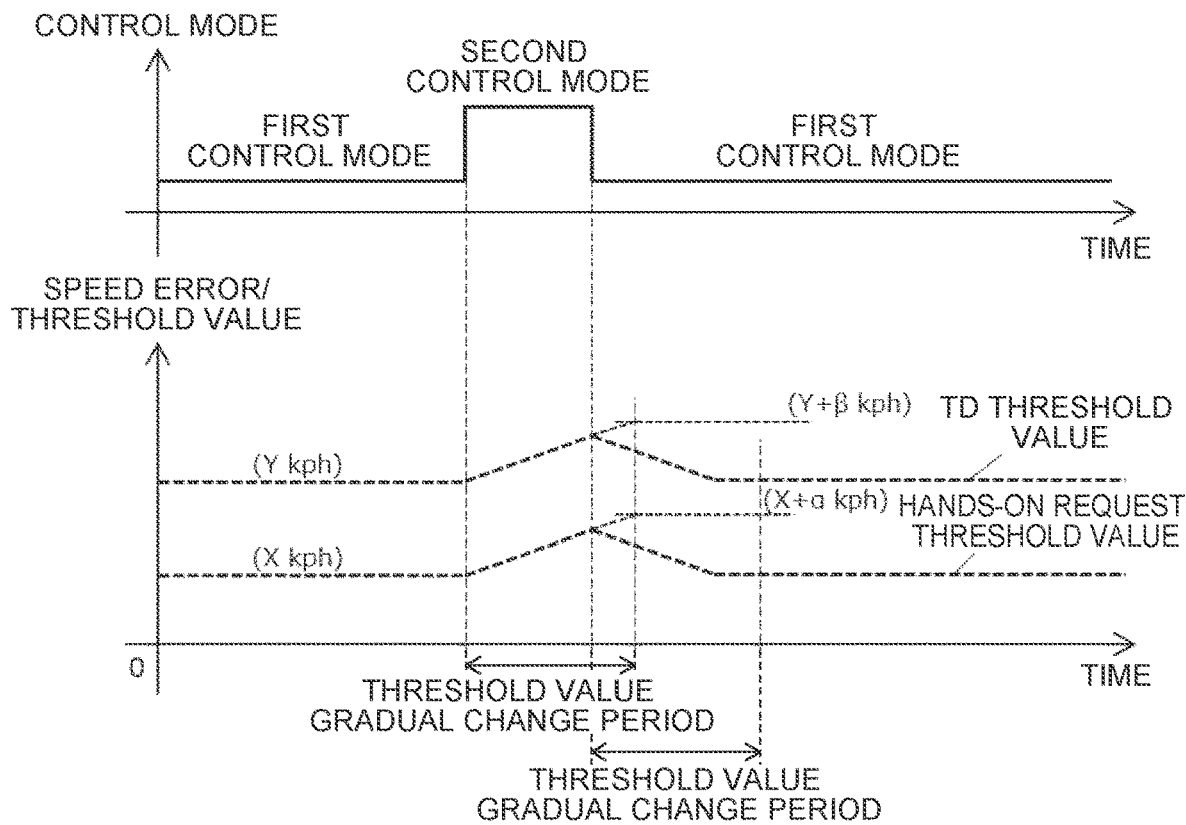
FIG. 9 is a diagram showing a modification of the threshold value setting shown in FIG. 8.

There may be a case where, when each threshold value is gradually increased after the control mode is switched from the first control mode to the second control mode, the control mode is switched to the first control mode again within the threshold value gradual change period. In such a case, for example, each threshold value may be changed as shown in FIG. 9. When the control mode is switched from the first control mode to the second control mode, it is unknown when to return to the first control mode next time. Therefore, the hands-on request threshold value is changed at a rate of increasing from X [kph] to X+α [kph] over the predetermined threshold value gradual change period. Further, the TD threshold value is changed at a rate of increasing from Y [kph] to Y+β [kph] over the predetermined threshold value gradual change period. Then, when the control mode is switched from the second control mode to the first control mode within the threshold value gradual change period, the hands-on request threshold value is lowered to X [kph] over the predetermined threshold value gradual change period from that time, and the TD threshold value is lowered to Y [kph] over the predetermined threshold value gradual change period.

4. Other Embodiments

As the setting of each threshold value, in the first threshold value change process, each threshold value may be gradually increased over the predetermined threshold value gradual change period as in the third embodiment, and in the second threshold value change process, each threshold value may be lowered in a manner of a step function as in the first embodiment.

Further, in the above-described embodiments, a long downhill road is exemplified as the case in which the second control mode is selected. However, the second control mode may be selected in other cases.

What is claimed is:

1. A vehicle equipped with an autonomous driving system that executes speed control that causes an actual speed to follow a target speed, wherein:
   the autonomous driving system includes
      at least one memory that stores at least one program, and
      at least one processor connected to the at least one memory; and
   the at least one processor executes, through execution of the at least one program,
      a control mode switching process of switching a control mode of the speed control between a first control mode and a second control mode in accordance with a driving condition, the first control mode being a mode in which the actual speed is caused to follow the target speed through active use of a brake, and the second control mode being a mode in which the actual speed is caused to follow the target speed while use of the brake is suppressed, a notification process of providing a notification to a driver when a speed error between the target speed and the actual speed exceeds a threshold value while the speed control is being executed, a first threshold value change process of changing the threshold value to a value larger than a value in the first control mode when the control mode is switched from the first control mode to the second control mode, and a second threshold value change process of changing the threshold value to a value smaller than a value in the second control mode when the control mode is switched from the second control mode to the first control mode.

2. The vehicle according to claim 1, wherein in the second threshold value change process, the threshold value is gradually changed to the value smaller than the value in the second control mode.

3. The vehicle according to claim 1, wherein in the first threshold value change process, the threshold value is gradually changed to the value larger than the value in the first control mode.

* * * * *